United States Patent
Takiguchi

(10) Patent No.: US 10,683,429 B2
(45) Date of Patent: Jun. 16, 2020

(54) AQUEOUS COATING COMPOSITION AND PIGMENT PASTE

(71) Applicant: Seiko Epson Corporation, Tokyo (JP)

(72) Inventor: Hiroshi Takiguchi, Matsumoto (JP)

(73) Assignee: Seiko Epson Corporation (JP)

(*) Notice: Subject to any disclaimer, the term of this patent is extended or adjusted under 35 U.S.C. 154(b) by 30 days.

(21) Appl. No.: 16/013,150

(22) Filed: Jun. 20, 2018

(65) Prior Publication Data

US 2018/0371281 A1   Dec. 27, 2018

(30) Foreign Application Priority Data

Jun. 21, 2017   (JP) .................. 2017-121237

(51) Int. Cl.
```
C09K 9/00      (2006.01)
C09D 17/00     (2006.01)
C09C 1/64      (2006.01)
C09D 5/02      (2006.01)
C09D 7/40      (2018.01)
```

(52) U.S. Cl.
CPC ............ *C09D 17/006* (2013.01); *C09C 1/644* (2013.01); *C09D 5/022* (2013.01); *C09D 5/028* (2013.01); *C09D 7/70* (2018.01); *C01P 2004/20* (2013.01); *C01P 2004/24* (2013.01); *C01P 2004/54* (2013.01); *C01P 2004/61* (2013.01); *C01P 2006/60* (2013.01)

(58) Field of Classification Search
CPC ........ C09D 17/006; C09D 7/70; C09D 5/022; C09D 11/322; C09C 1/644; C01P 2004/20; C01P 2004/54; C01P 2004/61; C08K 5/42; C08K 5/52; C08K 2003/0812

USPC .................................. 523/205, 200
See application file for complete search history.

(56) References Cited

U.S. PATENT DOCUMENTS

| | | | | |
|---|---|---|---|---|
| 6,602,339 | B2 * | 8/2003 | Hashizume | B22F 1/02 106/404 |
| 8,919,942 | B2 * | 12/2014 | Koike | B41M 7/009 347/100 |
| 9,334,411 | B2 * | 5/2016 | Denda | C08K 5/52 |
| 9,637,655 | B2 * | 5/2017 | Denda | C08K 5/52 |
| 2008/0081864 | A1 | 4/2008 | Takano | |
| 2009/0274846 | A1 * | 11/2009 | Wada | C08G 18/6254 427/407.1 |
| 2011/0008613 | A1 | 1/2011 | Takano et al. | |
| 2012/0295082 | A1 | 11/2012 | Toyoda et al. | |
| 2015/0166805 | A1 | 6/2015 | Toyoda et al. | |
| 2015/0191602 | A1 | 7/2015 | Denda | |
| 2016/0304733 | A1 | 10/2016 | Toyoda et al. | |
| 2017/0121550 | A1 | 5/2017 | Denda | |
| 2017/0210907 | A1 | 7/2017 | Toyoda et al. | |

FOREIGN PATENT DOCUMENTS

| | | |
|---|---|---|
| JP | 2003-213157 A | 7/2003 |
| JP | 2006-169393 A | 6/2006 |
| JP | 2009-215411 A | 9/2009 |
| JP | 2012-162638 A | 8/2012 |
| JP | 2013-159791 A | 8/2013 |
| JP | 2015-129208 A | 7/2015 |

\* cited by examiner

*Primary Examiner* — Hannah J Pak

(74) *Attorney, Agent, or Firm* — Harness, Dickey & Pierce, P.L.C.

(57) ABSTRACT

An aqueous coating composition includes an aluminum pigment, and the aluminum pigment is composed of tabular particles which are surface-treated by a fluorine-containing compound and which have an average thickness (Z) of 8 to 100 nm in a thickness direction thereof.

7 Claims, No Drawings

AQUEOUS COATING COMPOSITION AND PIGMENT PASTE

BACKGROUND

1. Technical Field

The present invention relates to an aqueous coating composition and a pigment paste.

2. Related Art

Heretofore, as a method for manufacturing ornaments having a glossy appearance, for example, metal plating, foil stamping using metal foil, or thermal transfer using metal foil has been used in the past. However, by those methods described above, there may arise problems such that a fine pattern cannot be easily formed, and a curved portion cannot be easily processed.

In recent years, in painting fields, in order to achieve pollution-free environments and to improve working environments, a high solid-type paint in which the amount of an organic solvent is decreased as much as possible and an aqueous paint using water as a solvent have been increasingly used. In addition, in accordance with technical improvement of aqueous paints, a coating film having a high-class feeling which could only be achieved by a solvent-type paint can also be realized by an aqueous paint.

For example, paints containing metal powders have also been widely studied. In particular, aluminum has been studied since the metallic glossiness can be expected, the processing can be easily performed, and the cost is advantageous. Although a paint containing an aluminum powder has a preferable coating workability, the inherent metallic glossiness and high-class feeling of aluminum itself may not be easily obtained in some cases. One reason of this problem is that since aluminum tends to react with water and/or to be oxidized, aluminum is liable to be chemically changed, for example, to a hydroxide or an oxide, and the metallic glossiness may be degraded in some cases; hence, in order to prevent the change described above, various studies have been carried out (for example, see JP-A-2013-159791 and JP-A-2012-162638).

SUMMARY

In an aqueous paint, when the thickness of an aluminum pigment (hereinafter, referred to as "aluminum pigment particles" in some cases) is decreased, and the planar size thereof is increased, the rate of a metallic glossy surface with respect to the total mass of the metal can be increased, and hence, the metallic glossiness of a coating film is likely to be improved. Furthermore, when tabular-shaped (scale-shaped) pigment particles are used, the anisotropic property is increased, and in addition, the weight of the pigment itself is decreased; hence, a so-called leafing function may also be used. Incidentally, the leafing indicates the function in which plane surfaces of scale-shaped (tabular-shaped) pigment particles are adhered primarily by the surface tension to a surface of an object to be applied in parallel or approximately in parallel thereto, and by this leafing function, the metallic glossiness of the coating film is further improved. Hence, in order to sufficiently obtain the leafing function, an aluminum pigment having a high fluidity is preferable, and in order to allow the aluminum pigment to rapidly flow by the influence of the surface tension, it is believed that the thickness of each pigment particle is preferably further decreased.

However, when the thickness of aluminum is excessively decreased, the rate of the metal surface with respect to the entire metal is increased, and when the chemical change starts from the surface thereof, the thickness of a portion remaining in the form of the metal may be seriously decreased in some cases. Hence, when the thickness of aluminum is decreased, a countermeasure which suppresses the phenomenon as described above is required. In particular, in the case of an aqueous paint, there has been a problem in that an aluminum surface is liable to be changed to an aluminum hydroxide, and when water resistance is not imparted, the degree of transparency is increased from the aluminum surface by the chemical change, and as a result, the metallic glossiness may disappear in some cases. In addition, by a reaction between aluminum and water, a hydrogen gas may be generated in some cases, and hence, a safety problem may also arise.

In consideration of the above situation, in order to maintain the metallic glossiness, heretofore, for example, as countermeasures, a protective layer of a silicon oxide or the like is provided on the aluminum surface, or the thickness of aluminum is increased to a predetermined thickness or more. However, by the countermeasures described above, since the weight of aluminum pigment particles is increased, the sedimentation rate thereof is increased, and as a result, various problems such that the stability of an aluminum dispersion is degraded may occur in some cases.

An advantage of some aspects of the invention is to provide an aqueous coating composition and a pigment paste each of which is able to form a coating film excellent in metallic glossiness and water resistance.

The invention was made in order to achieve at least a part of the object described above and can be realized by the following aspects or application examples.

One aspect of the aqueous coating composition according to the invention is an aqueous coating composition comprising an aluminum pigment, and the aluminum pigment is composed of tabular particles which are surface-treated by a fluorine-containing compound and which have an average thickness (Z) of 8 to 100 nm in a thickness direction thereof.

According to the aqueous coating composition as described above, a coating film excellent in metallic glossiness and water resistance can be easily formed. That is, since the aluminum pigment contained in this aqueous coating composition is surface-treated by a fluorine-containing compound, the contact between metal aluminum and water and permeation thereof can be suppressed, so that the chemical reaction is suppressed. In addition, since the aluminum pigment is composed of tabular particles having an average thickness (Z) of 8 to 100 nm, even if the degree of transparency of the surface thereof is increased by the chemical change thereof, a sufficient metallic glossiness can be maintained, and in addition, a leafing effect to be imparted by the small thickness of the particle is likely to be obtained, so that a coating film excellent in metallic glossiness can be formed.

In the aqueous coating composition according to the invention, an average particle diameter (D) of the aluminum pigment particles may be 3 to 20 µm.

According to the aqueous coating composition as described above, the aluminum pigment is composed of tabular particles, and the areas thereof obtained when the aluminum pigment particles are projected in the thickness direction thereof are sufficiently large. Hence, a coating film excellent in metallic glossiness can be formed.

In the aqueous coating composition according to the invention, the ratio (D/Z) of the average particle diameter (D) to the average thickness (Z) of the aluminum pigment particles may be 10 to 1,500.

According to the aqueous coating composition as described above, since the ratio between the thickness of the aluminum pigment and the area obtained when the aluminum pigment is projected in the thickness direction thereof is more preferable, a coating film having a preferable metallic glossiness can be obtained, and in addition, in the state of the aqueous coating composition, the sedimentation of the aluminum pigment can be further suppressed.

In the aqueous coating composition according to the invention, the content of the aluminum pigment may be 3 to 20 percent by mass with respect to the total of the aqueous coating composition.

According to the aqueous coating composition as described above, a coating film having a more preferable metallic glossiness can be formed.

The aqueous coating composition according to the invention may further comprise a resin emulsion.

According to the aqueous coating composition as described above, for example, the adhesion of a coating film to be formed can be further improved.

The aqueous coating composition according to the invention may have a pH of 6.5 to 8.4.

According to the aqueous coating composition as described above, the metallic glossiness of the coating film can be more preferably maintained.

The aqueous coating composition according to the invention may further comprise a polyoxyethylene alkyl ether phosphoric acid compound.

According to the aqueous coating composition as described above, a stable dispersion state can be obtained for a longer period.

In the aqueous coating composition according to the invention, the polyoxyethylene alkyl ether phosphoric acid compound may be a compound represented by the following formula or its salt.

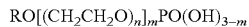

$$RO[(CH_2CH_2O)_n]_mPO(OH)_{3-m}$$

In the formula, R, n, and m represent an alkyl group, an integer of 1 or more, and an integer of 1 to 3, respectively.

According to the aqueous coating composition as described above, a stable dispersion state can be obtained for a longer period.

In the aqueous coating composition according to the invention, the content of the polyoxyethylene alkyl ether phosphoric acid compound may be 1 to 5 percent by mass with respect to the total of the aqueous coating composition.

One aspect of the pigment paste according to the invention is a pigment paste which is used for preparation of an aqueous coating composition and which comprises an aluminum pigment, and the aluminum pigment is composed of tabular particles which are surface-treated by a fluorine-containing compound and which have an average thickness (Z) is 8 to 100 nm in a thickness direction thereof.

According to the pigment paste as described above, a coating film excellent in metallic glossiness and water resistance can be easily formed. That is, since the aluminum pigment contained in this pigment paste is surface-treated by a fluorine-containing compound, the reaction with water is suppressed, and in addition, since the pigment paste is composed of tabular particles having an average thickness (Z) of 8 to 100 nm, even if the degree of transparency of the surface thereof is increased by the chemical change, a sufficient metallic glossiness can be maintained, and in addition, the leafing effect to be imparted by the small thickness of the particle is likely to be obtained, so that a coating film excellent in metallic glossiness can be formed.

DESCRIPTION OF EXEMPLARY EMBODIMENTS

Hereinafter, some embodiments of the invention will be described. The following embodiments are each described to illustrate one example of the invention. The invention is not limited at all to the following embodiments and may also include various modified embodiments to be performed without departing from the scope of the invention. In addition, every element described below is not always required to be an essential element of the invention.

An aqueous coating composition and a pigment paste according to this embodiment each contain an aluminum pigment, and the aluminum pigment mentioned above is composed of tabular particles which are surface-treated by a fluorine-containing compound and which have an average thickness (Z) of 8 to 100 nm in a thickness direction thereof.

Hereinafter, the aqueous coating composition and the pigment paste will be described in this order.

1. Aqueous Coating Composition

The aqueous coating composition according to this embodiment is an aqueous coating composition containing water and an aluminum pigment, and the aluminum pigment is composed of tabular particles which are surface-treated by a fluorine-containing compound and which have an average thickness (Z) of 8 to 100 nm in a thickness direction thereof.

1.1. Aluminum Pigment

The aluminum pigment contained in the aqueous coating composition according to this embodiment is a pigment composed of pigment particles (hereinafter, pigment particles which are formed using a material containing aluminum and which are not yet surface-treated are also called "mother particles" in some cases) which are formed using a material containing aluminum and which are surface-treated by a fluorine-containing compound. That is, the aluminum pigment contained in the aqueous coating composition according to this embodiment has the structure in which the surfaces of the pigment particles (mother particles) formed from a material containing aluminum are surface-treated by a fluorine-containing compound so as to be covered with a monolayer or a plurality of layers.

1.1.1. Mother Particles

First, the pigment particles (mother particles) formed from a material containing aluminum will be described. The mother particles each may be either a particle in which a region including at least the vicinity of the surface is formed from aluminum or a particle which is entirely formed from aluminum. In addition, the mother particles each may be a particle having a substrate portion formed from a nonmetallic material and a coating film formed from aluminum covering the substrate portion.

In order to secure the metallic glossiness and in consideration of the cost, the surfaces of the mother particles are at least preferably formed from aluminum or an aluminum alloy. When being dispersed in water, aluminum or an aluminum alloy generates a hydrogen gas by a reaction with water, and at the same time, since aluminum hydroxide or alumina is formed, the color of the mother particle may be changed to white or transparent in some cases. When this reaction occurs, the problem in that the metallic glossiness of the pigment is degraded may arise. In order to overcome the problem described above, in this embodiment, by the use of an aluminum pigment covered with a monolayer or a plurality of layers each containing a fluorine-containing compound, the water resistance of the aluminum pigment is significantly improved, and hence, the problem as described above can be suppressed from being generated.

Although the mother particles may be formed by any method, for example, mother particles which are obtained in such a way that after a film is formed using aluminum by a deposition method on one surface of a sheet substrate material, the film thus formed is peeled away from the sheet substrate material and then pulverized are preferable. Instead of using the deposition method, an ion plating method or a sputtering method may also be used. By the methods described above, since scale-shaped (tabular-shaped) mother particles having a small variation in thickness and a high surface flatness can be obtained, for example, the inherent metallic glossiness of the mother particles is more effectively and preferably realized.

As the sheet substrate material, for example, a plastic film, such as a poly(ethylene terephthalate), may be used. In addition, in order to impart the peeling property in advance to a surface of the sheet substrate material on which the film is to be formed, a mold-releasing agent, such as a silicone oil, may be applied on the surface described above, or a peeling-purpose resin layer may be formed thereon. As a resin used for the peeling-purpose resin layer, for example, there may be mentioned a poly(vinyl alcohol), a poly(vinyl butyral), a polyethylene glycol, a polyacrylic acid, a polyacrylamide, a cellulose derivative, such as cellulose acetate butyrate, or a modified nylon resin. The peeling and the pulverization are performed, for example, by irradiating the film described above in a nonaqueous medium with ultrasonic waves or by applying an external force thereto by stirring using a homogenizer or the like.

As the nonaqueous medium used for the peeling and the pulverization to be performed by the method described above, for example, there may be preferably used an alcohol, such as methanol, ethanol, propanol, or butanol; a hydrocarbon compound, such as n-heptane, n-octane, decane, dodecane, tetradecane, toluene, xylene, cymene, durene, indene, dipentene, tetrahydronaphthalene, decahydronaphthalene, or cyclohexylbenzene; an ether compound, such as ethylene glycol dimethyl ether, ethylene glycol diethyl ether, ethylene glycol methylethyl ether, diethylene glycol dimethyl ether, diethylene glycol diethyl ether, diethylene glycol methylethyl ether, diethylene glycol monobutyl ether acetate, diethylene glycol n-butyl ether, tripropylene glycol dimethyl ether, triethylene glycol diethyl ether, propylene glycol monomethyl ether acetate, 1,2-dimethoxyethane, bis (2-methoxyethyl)ether, or p-dioxane; or a polar organic solvent, such as propylene carbonate, γ-butyrolactone, N-methyl-2-pyrrolidone, N,N-dimethylformamide, N,N-dimethylacetamide, dimethylsulfoxide, cyclohexanone, or acetonitrile. By the use of the nonaqueous medium as mentioned above, while the mother particles are prevented from being unfavorably oxidized or the like, the variation in size, shape, and characteristics among the particles can be reduced.

In addition, since preferable average particle diameter and average thickness of the mother particles are approximately equal to the average particle diameter and the average thickness of an aluminum pigment to be described later, the description thereof is omitted here.

1.1.2. Fluorine-Containing Compound

Next, the fluorine-containing compound used for the surface treatment of the mother particles will be described. As described above, the aluminum pigment contained in the aqueous coating composition according to this embodiment is a pigment obtained by performing a surface treatment on the mother particles with a fluorine-containing compound. As the fluorine-containing compound described above, for example, a fluorine-containing phosphonic acid, a fluorine-containing carboxylic acid, a fluorine-containing sulfonic acid, or a salt thereof may be preferably used. By the use of the fluorine-containing compound mentioned above, since a phosphate group, a carboxy group, a sulfate group, or the like is bonded to the surfaces of the mother particles to form a coating film, an aluminum pigment having an improved water resistance can be obtained. Accordingly, the reaction of the aluminum pigment with water in an aqueous medium can be effectively suppressed, and an aqueous coating composition also excellent in water dispersibility can be obtained. Among those compounds mentioned above, since the phosphate group has a particularly excellent bonding ability to the surfaces of the mother particles, a fluorine-containing phosphonic acid and its salt are more preferable.

As the fluorine-containing phosphonic acid and its salt, a compound having the structure represented by the following general formula (1) is preferable.

$$R^1{}_n\!-\!\!\overset{\displaystyle O}{\underset{\displaystyle \|}{P}}\!\!-\!(OM)_{3-n} \tag{1}$$

In the above formula (1), $R^1$ represents one group independently selected from the following structures, M independently represents a hydrogen atom, a monovalent metal ion, an ammonium ion, or $-NR^2R^3R^4$. Although $R^2$, $R^3$, and $R^4$ each represent a hydrogen atom or a $C_2H_4OH$ group, the case in which $R^2$, $R^3$, and $R^4$ each represent a hydrogen atom is excluded. In addition, n indicates an integer of 1 to 3, m indicates an integer of 1 to 12, and l indicates an integer of 1 to 12.

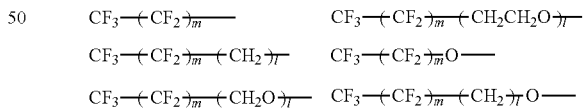

In the above formula (1), although m indicates an integer of 1 to 12, an integer of 1 to 8 is preferable, and an integer of 1 to 5 is more preferable. In addition, although l indicates an integer of 1 to 12, an integer of 1 to 10 is preferable, and an integer of 1 to 6 is more preferable. When m and l are each in the above preferable range, the effect as described above can be more significantly obtained.

As the above fluorine-containing phosphonic acid, since the balance between the adsorption ability to the surfaces of the mother particles and the improvement in water resistance is excellent, a compound represented by the following general formula (2) is particularly preferable.

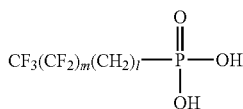

(2)

In the above formula (2), although m indicates an integer of 1 to 12, an integer of 1 to 8 is preferable, and an integer of 1 to 5 is more preferable. In addition, although l indicates an integer of 1 to 12, an integer of 1 to 10 is preferable, and an integer of 1 to 6 is more preferable. When m and l are each in the above preferable range, the effect as described above can be more significantly obtained.

As the fluorine-containing carboxylic acid and its salt, a compound having the structure represented by the following general formula (3) is preferable.

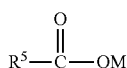

(3)

In the above formula (3), $R^5$ is one group selected from the following structures, and M represents a hydrogen atom, a monovalent metal ion, or an ammonium ion. Although m indicates an integer of 1 to 12, an integer of 1 to 8 is preferable, and an integer of 1 to 5 is more preferable. In addition, although l indicates an integer of 1 to 12, an integer of 1 to 10 is preferable, and an integer of 1 to 6 is more preferable.

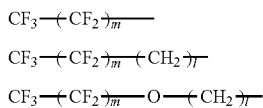

As the fluorine-containing sulfonic acid and its salt, a compound having the structure represented by the following general formula (4) is preferable.

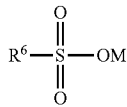

(4)

In the above formula (4), $R^6$ represents one group selected from the following structures, and M represents a hydrogen atom, a monovalent metal ion, or an ammonium ion. In addition, m indicates an integer of 5 to 17, and l indicates an integer of 1 to 12.

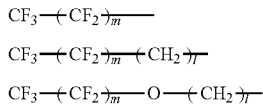

In addition, the fluorine-containing compound preferably includes a perfluoroalkyl group ($C_nF_{2n+1}$—) as a part of the structure thereof, and the number of carbon atoms of the perfluoroalkyl group is more preferably 1 to 6. Since the fluorine-containing compound has the structure as described above, the water resistance is improved, and an aluminum pigment excellent in metallic glossiness and water dispersibility is likely to be obtained.

In addition, the molecular weight of the fluorine-containing compound is preferably 1,000 or less. When the fluorine-containing compound to be adsorbed on the surfaces of the mother particles is one of the fluorine-containing polymers disclosed, for example, in JP-A-2003-213157, JP-A-2006-169393, and JP-A-2009-215411, since the thickness of the coating film is excessively increased, the metallic glossiness is degraded, and in addition, since the interaction between the aluminum pigment particles on each of which the coating film is formed is increased, the water dispersibility is seriously degraded in some cases. Hence, the film formed on the surface of the mother particle is preferably a monolayer film formed from a fluorine-containing compound having a molecular weight of 1,000 or less.

As a particular example of the fluorine-containing compound as described above, FHP-2-OH (2-(perfluorohexyl)ethyl phosphonic acid, manufactured by NOK Corporation) or FBP-2-OH (2-(perfluorobutyl)ethyl phosphonic acid, manufactured by NOK Corporation) may be mentioned by way of example.

1.1.3. Tabular Shape and Average Thickness

The aluminum pigment used for the aqueous coating composition of this embodiment is composed of tabular particles, and the average thickness (Z) thereof is 8 to 100 nm in a thickness direction thereof. When the shape of the aluminum pigment particle has a tabular shape (also called "scale shape"), since a light reflection property is superior, an image excellent in metallic glossiness can be obtained.

In this specification, the tabular shape (scale shape) indicates the shape in which as is a flat plate shape, a curved plate shape, or the like, the area of the shape observed at a predetermined angle (viewed in plane) is larger than the area of the shape observed at an angle orthogonal to the above observation direction, and in particular, a ratio ($S_1/S_0$) of an area $S_1$ [μm$^2$] observed in a direction at which a projected area is maximized (viewed in plane) to an area $S_0$ [μm$^2$] observed in one of directions orthogonal to the above observation direction at which the area is maximized is preferably 2 or more, more preferably 5 or more, and particularly preferably 8 or more. As for the value described above, for example, arbitrarily selected ten particles are observed, and the average value calculated from those particles may be employed.

The average particle diameter (also called "average particle diameter (D)" in some cases) of the aluminum pigment particles contained in the aqueous coating composition according to this embodiment may be 1 to 50 μm, preferably 2 to 40 μm, more preferably 3 to 20 μm, and further preferably 5 to 15 μm.

In addition, the average thickness (Z) of the aluminum pigment particles contained in the aqueous coating composition according to this embodiment is 8 to 100 nm, preferably 9 to 90 nm, and more preferably 10 to 80 nm. Although the thickness of the coating film is difficult to measure, the thickness thereof is not particularly limited and may be, for example, approximately 0.5 to 10 nm.

When an aluminum pigment having an average particle diameter and an average thickness in the ranges described above is used for an aqueous coating composition, a coating film (image) excellent in film smoothness and metallic glossiness can be formed. In addition, a pigment dispersion liquid can be manufactured with a good productivity, and in addition, unfavorable deformation of the aluminum pigment during the manufacturing of the aqueous coating composition can also be prevented.

This average particle diameter is represented by 50% average particle diameter (R50) of equivalent circle diameters obtained from the areas of projected images of the aluminum pigment particles measured by a particle image analyzer. The "equivalent circle diameter" is the diameter of a circle assumed to have the same area as that of the projected image of each aluminum pigment particle measured by a particle image analyzer. For example, when the projected image of the aluminum pigment particle is a polygonal shape, the circle is assumed from the area thereof by calculation, and the diameter of the circle thus assumed is called the equivalent circle diameter.

The area and the equivalent circle diameter of the projected image of the aluminum pigment particle may be measured by using a particle image analyzer. As the particle image analyzer described above, for example, Flow type particle image analyzers FPIA-2100, FPIA-3000, and FPIA-3000S (each manufactured by Sysmex Corporation) may be mentioned. In addition, the average particle diameter of the equivalent circle diameters is the particle diameter based on the number of particles. In addition, as a measurement method using FPIA-3000 or FPIA-3000S, a method in which a high magnification imaging unit is used, and measurement is performed by a HPF measurement mode may be mentioned by way of example.

In addition, the average thickness is the average value of thicknesses of 10 aluminum pigment particles which are obtained from side surface images thereof taken by a transmission electron microscope (TEM) or a scanning electron microscope (SEM). As the transmission electron microscope (TEM), for example, model "JEM-2000EX" manufactured by JEOL Ltd. may be mentioned, and as the scanning electron microscope, for example, model "S-4700" manufactured by Hitachi High-Technologies Corporation may be mentioned.

In addition, the ratio (D/Z) of the average particle diameter (D) to the average thickness (Z) of the aluminum pigment is preferably 5 to 3,000, more preferably 10 to 1,500, further preferably 15 to 1,000, and particularly preferably 50 to 800. When the ratio is in the range as described above, the leafing effect can be sufficiently obtained, and a coating film having a preferable metallic glossiness can also be obtained, and in addition, in the aqueous coating composition state, the sedimentation of the aluminum pigment can be further suppressed.

1.1.4. Physical Properties of Aluminum Pigment XPS Analysis

According to an XPS (X-ray Photoelectron Spectroscopy) analysis, the information of a top surface (having a depth of approximately several nanometers) of the aluminum pigment can be obtained. The XPS analysis is an analysis method in which a sample is irradiated with X-rays in an ultrahigh vacuum environment, and a photoelectron emitted thereby is detected. Since the photoelectron thus emitted is derived from an inner shell electron of an atom to be irradiated, and the energy thereof is determined by the element, when the energy thereof is detected, a qualitative analysis can be performed.

When an XPS analysis (incident angle on a sample surface: 45°, detection angle: 90°) is performed, in the aluminum pigment contained in the aqueous coating composition according to this embodiment, the concentration of a fluorine atom may be, for example, approximately 21 to 35 percent by atom. This indicates that in the top surface (having a depth of approximately several nanometers) of the aluminum pigment, the fluorine-containing compound is densely present. When the concentration of the fluorine atom in the aluminum pigment is in the range described above, since the water resistance is significantly improved, an aqueous coating composition not only excellent in metallic glossiness but also particularly superior in water dispersibility can be obtained. When the concentration of the fluorine atom in the aluminum pigment is less than the range described above, since the water resistance becomes insufficient, the metallic glossiness may disappear due to the reaction of the aluminum pigment with water, and in addition, the water dispersibility may also be degraded in some cases. On the other hand, when the concentration of the fluorine atom in the aluminum pigment is more than the range described above, manufacturing of the aluminum pigment as described above may have various technical difficulties in some cases.

When an XPS analysis (incident angle on a sample surface: 45°, detection angle: 90°) is performed, in the aluminum pigment contained in the aqueous coating composition according to this embodiment, the concentration of phosphor, sulfur, nitrogen, or the total of those atoms is preferably 0.8 percent by atom or more. This indicates that fluorine-containing compounds, such as a fluorine-containing phosphonic acid, a fluorine-containing sulfonic acid, and salts thereof, are adsorbed to the top surface (having a depth of approximately several nanometers) of the aluminum pigment and are densely present thereon. When the concentration of phosphor, sulfur, nitrogen, or the total of those atoms is 0.8 percent by atom or more, since the water resistance is significantly improved, an aqueous coating composition not only excellent in metallic glossiness but also particularly superior in water dispersibility can be obtained.

When an XPS analysis (incident angle on a sample surface: 45°, detection angle: 90°) is performed, in the aluminum pigment contained in the aqueous coating composition according to this embodiment, the ratio ([F]/[O]) of the concentration ([F]: percent by atom) of a fluorine atom to the concentration ([O]: percent by atom) of an oxygen atom is preferably 0.7 to 1.2. Since the concentration of the oxygen atom tends to depend on hydroxides of aluminum contained in the aluminum pigment, the ratio described above also indicates that in the top surface (having a depth of approximately several nanometers) of aluminum pigment, the fluorine-containing compound is densely present. When the ratio ([F]/[O]) of the aluminum pigment is in the range described above, the balance between the concentration of the fluorine atom and the concentration of the oxygen atom in the surface of the aluminum pigment is improved, and sine the water resistance is significantly improved, an aqueous coating composition not only excellent in metallic glossiness but also particularly superior in water dispersibility can be obtained.

An X-ray photoelectron spectroscopic apparatus may be used for the analysis, and a commercially available apparatus may be used. As the commercially available measurement apparatus, for example, a "hybrid electron spectroscopic apparatus" manufactured by Thermo Electron Co., Ltd. may be mentioned.

When an XPS analysis (incident angle on a sample surface: 45°, detection angle: 90°) is performed, in the aluminum pigment contained in the aqueous coating composition according to this embodiment, the ratio ([F]/[Al]) of the concentration ([F]: percent by atom) of a fluorine atom to the concentration ([Al]: percent by atom) of an aluminum atom is preferably 0.7 to 1.2. This ratio also indicates that in the top surface (having a depth of approximately several nanometers) of the aluminum pigment, the fluorine-containing compound is densely present. When the ratio ([F]/[Al]) is in the range described above, the balance between the concentration of the fluorine atom and the concentration of the aluminum atom in the surface of the aluminum pigment is improved, and sine the water resistance is significantly improved, an aqueous coating composition not only excellent in metallic glossiness but also particularly superior in water dispersibility can be obtained.

Furthermore, since the electron state is changed by the environment (Chemical state) in which the atom is present, by the use of a slight shift of the peak position, the chemical structure analysis can be performed. In particular, after components corresponding to the chemical states are approximated, for example, by Voigt function, and the peak separation is then performed, the rate of each component can be calculated.

In the case of an aluminum pigment surface-treated by a fluorine-containing phosphonic acid (salt), when an X-ray photoelectron spectroscopic spectrum is approximated by Voigt function, and the peak separation is then performed, a peak may be present between 190 to 192 eV. Since the fluorine-containing phosphonic acid (salt) is bonded to the surfaces of the mother particles, the peak of P (phosphor) is chemical-shifted to a range of from 190 to 192 eV. Since the peak is present between 190 to 192 eV, it is confirmed that the fluorine-containing phosphonic acid (salt) is surely bonded to the surfaces of the mother particles. Accordingly, the water resistance is imparted to the aluminum pigment, and an aqueous coating composition not only excellent metallic glossiness but also particularly superior in water dispersibility can be obtained.

In the case of the aluminum pigment which is surface-treated by the fluorine-containing compound, in an X-ray photoelectron spectroscopic spectrum, peaks are present at 291 eV and 293 eV. The peak at 291 eV is a peak derived from —$CF_2$—, and the peak at 293 eV is a peak derived from —$CF_3$. From the results described above, when the peaks are recognized at 291 eV and 293 eV, it is found that the fluorine-containing compound is bonded to the surfaces of the mother particles.

1.1.5. Content of Aluminum Pigment

The concentration (content) of the aluminum pigment in the aqueous coating composition according to this embodiment with respect to the total mass of the aqueous coating composition is, as the solid component, preferably 1 to 40 percent by mass, more preferably 1 to 35 percent by mass, and further preferably 1 to 30 percent by mass. When the content is in the range as described above, a coating film having a preferable metallic glossiness can be formed.

1.2. Water

The aqueous coating composition according to this embodiment contains water. As the water, for example, pure water, such as ion-exchanged water, ultrafiltrated water, reverse osmosis water, or distilled water, and water, such as ultrapure water, in which ionic impurities are removed as much as possible may be mentioned. In addition, by the use of water sterilized, for example, by UV-ray radiation or by addition of hydrogen peroxide, when the aqueous coating composition is stored for a long time, the generation of bacteria and fungi can be suppressed.

The content of the water with respect to the total mass of the aqueous coating composition is 30 percent by mass or more, preferably 40 percent by mass or more, more preferably 45 percent by mass or more, and further preferably 50 percent by mass or more. In addition, the water in the aqueous coating composition also includes water to be added, for example, to a pigment dispersion liquid and a resin particle dispersion liquid, each of which is used as a raw material. Since the content of the water is 30 percent by mass or more, the aqueous coating composition may have a relatively low viscosity. In addition, the upper limit of the content of the water with respect to the total mass of the aqueous coating composition is preferably 90 percent by mass or less, more preferably 85 percent by mass or less, and further preferably 80 percent by mass or less. In addition, in this specification, the "aqueous" indicates a composition containing 30 percent by mass or more of water with respect to the total mass (100 percent by mass) of the aqueous coating composition.

1.3. Other Components

To the aqueous coating composition according to this embodiment, if needed, a resin (resin emulsion), a and/or the like may be added.

1.3.1 Resin

The resin (resin emulsion) has a function to strongly adhere the aluminum pigment to an object to be applied. As the resin, for example, there may be mentioned a homopolymer or a copolymer of acrylic acid, an acrylate, methacrylic acid, a methacrylate, acrylonitrile, cyanoacrylate, acrylamide, an olefin, styrene, vinyl acetate, vinyl chloride, vinyl alcohol, vinyl ether, vinyl pyrrolidone, vinyl pyridine, vinyl carbazole, vinyl imidazole, or vinylidene chloride; an urethane resin, a fluorine-containing resin, or a natural resin. In addition, as the above copolymer, any one of a random copolymer, a block copolymer, an alternating copolymer, and a graft copolymer may be used. As a preferable example of the resin emulsion, for example, there may be mentioned Polysol AP-7010 or AP-7030 (each manufactured by Showa Denko K.K.).

1.3.2. Surfactant

As the surfactant, an acetylene glycol-based surfactant or a polysiloxane-based surfactant is preferably contained. The acetylene glycol-based surfactant and the polysiloxane-based surfactant are each able to improve the wettability or the permeability to an object to be applied. As the acetylene glycol-based surfactant, for example, there may be mentioned 2,4,7,9-tetramethyl-5-decyl-4,7-diol, 3,6-dimethyl-4-octyne-3,6-diol, 3,5-dimethyl-1-hexyne-3-ol, or 2,4-dimethyl-5-hexyne-3-ol. In addition, as the acetylene glycol-based surfactant, commercially available products may also be used, and for example, there may be mentioned Olfine E1010, STG, and Y (each manufactured by Nisshin Chemical Industry Co., Ltd.) and Surfynol 104, 82, 465, 485, and TG (each manufactured by Air Products and Chemicals Inc.). As the polysiloxane-based surfactant, commercially available products may also be used, and for example, there may be mentioned BYK-347 and BYK-348 (each manufactured by BYK Japan KK). Furthermore, other surfactants, such as an anionic surfactant, a nonionic surfactant, and an amphoteric surfactant, may also be added to the aqueous coating composition. As the above surfactants, for example, there may be mentioned Disperbyk102 (D102) (manufactured by BYK-Chemie) and Disparlon DA-325 (manufactured by Kusumoto Chemicals, Ltd.).

1.3.3 Alkanediol

The alkanediol is able to improve the wettability and the permeability to a recording surface, such as an object to be applied. As the alkanediol, for example, a 1,2-alkanediol having 4 to 8 carbon atoms, such as 1,2-butanediol, 1,2-pentanediol, 1,2-hexanediol, 1,2-heptanediol, or 1,2-octanediol, is preferable. Among those mentioned above, 1,2-hexanediol, 1,2-heptanediol, and 1,2-octanediol, each of which has 6 to 8 carbon atoms, are more preferable since having a particularly high permeability to an object to be applied.

1.3.4. Polyalcohol

The polyalcohol is able, for example, to suppress the aqueous coating composition from being dried, to maintain a preferable viscosity for a long time, and to maintain a preferable coating property. As the polyalcohol, for example, there may be mentioned ethylene glycol, diethylene glycol, triethylene glycol, a polyethylene glycol, a polypropylene glycol, propylene glycol, butylene glycol, 1,2,6-hexanetriol, thioglycol, hexylene glycol, glycerin, trimethylolethane, or trimethylolpropane.

1.3.5. pH Adjuster

As the pH adjuster, for example, there may be mentioned potassium dihydrogen phosphate, sodium dihydrogen phosphate, sodium hydroxide, lithium hydroxide, potassium hydroxide, ammonium, diethanolamine, triethanolamine, triisopropanolamine, potassium carbonate, sodium carbonate, or sodium hydrogen carbonate.

1.3.6. Others

In addition, to the aqueous coating composition according to this embodiment, additives, such as a fixing agent including a water soluble rosin; a fungicide/antiseptic agent including sodium benzoic acid; an antioxidant/UV absorber including an allophanate; a chelating agent, and/or an oxygen absorber may also be added. Those additives may be used alone, or at least two types thereof may be used in combination.

In addition, in order to further cover the aluminum pigment surface-treated by the fluorine-containing compound, an ester compound of a polyoxyethylene alkyl ether may also be contained. The ester compound of a polyoxyethylene alkyl ether may be an ester of phosphoric acid, carboxylic acid, sulfonic acid, or the like. In particular, a polyoxyethylene alkyl ether phosphoric acid compound (ester) is preferable, and as the polyoxyethylene alkyl ether phosphoric acid compound, an ester obtained by dehydration condensation between phosphoric acid and a polyoxyethylene alkyl ether may be mentioned. In more particular, the compound represented by the following formula may be mentioned by way of example.

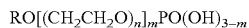

$$RO[(CH_2CH_2O)_n]_m PO(OH)_{3-m}$$

In the above formula, R represents an alkyl group, n represents an integer of 1 or more, and m represents an integer of 1 to 3.

The compound represented by the above formula has the structure in which at least one hydrogen atom of the phosphoric acid portion is replaced by at least one organic group. When the surface of the aluminum pigment and the polyoxyethylene alkyl ether phosphoric acid compound react with each other, the surface of aluminum and the phosphor atom are bonded to each other by a covalent bond with the oxygen atom interposed therebetween. As a result, a stronger coating film can be formed on the surface of the aluminum pigment. In addition, the polyoxyethylene alkyl ether phosphoric acid compound also indicates, besides a compound only having the above structure, a compound having the structure only formed of the salt thereof and a compound having the above two types of structures. As the polyoxyethylene alkyl ether phosphoric acid compound described above, for example, a polyoxyethylene alkyl ether phosphate or a salt thereof may be mentioned.

As the polyoxyethylene alkyl ether phosphoric acid compound described above, for example, there may be mentioned NIKKOL DDP-2, DDP-4, DDP-6, DDP-10, TLP-4, TCP-5, TDP-2, TDP-6, TDP-8, or TDP-10 (each manufactured by Nikko Chemicals Co., Ltd.); Plysurf AL, A210D, A-208B, or A219B (each manufactured by DKS Co., Ltd.); Adekacol CS-1361E (manufactured by ADEKA Corporation); or Phosphanol RD-720 or ML-200 (manufactured by Toho Chemical Industry Co., Ltd.).

In addition, as the salt of the polyoxyethylene alkyl ether phosphate, for example, Nikkol DLP-10 or DOP-8NV (each manufactured by Nikko Chemicals Co., Ltd.), or Plysurf M-208F or M-208B (each manufactured by DKS Co., Ltd.) may be mentioned.

1.4. Physical Properties of Aqueous Coating Composition

A viscosity at 20° C. of the aqueous coating composition according to this embodiment is preferably 10 to 500 mPa·s and more preferably 30 to 200 mPa·s. When the viscosity of the aqueous coating composition at 20° C. is in the range described above, spreadability and sagging resistance thereof are well balanced when the aqueous coating composition is applied to an object to be applied.

In addition, the pH of the aqueous coating composition according to this embodiment is preferably 5 to 10, more preferably 6 to 9.5, further preferably 6.5 to 8.4, and particularly preferably 6.7 to 8.2. When the pH is approximately in the range described above, the chemical change of the surface of the aluminum pigment can be sufficiently suppressed, and the metallic glossiness of a coating film formed from the aqueous coating composition can be further preferably maintained.

1.5. Method for Manufacturing Aqueous Coating Composition

The aqueous coating composition according to this embodiment can be formed, for example, by the following method.

First, a dispersion liquid in which the mother particles described above are dispersed in a nonaqueous medium is prepared. After this dispersion liquid is diluted, if needed, with the same type nonaqueous medium or a different type nonaqueous medium, a pulverization treatment is performed on the mother particles by stirring with a stirrer, such as a homogenizer, so that the average particle diameter of the mother particles is decreased to approximately 20 µm or less. Although being not particularly limited, the time for the pulverization treatment is generally 1 to 24 hours. In addition, as the nonaqueous medium to be used for the dilution, there may be mentioned a nonaqueous medium similar to that to be used when the peeling and the pulverization described above by way of example are performed.

Next, a fluorine-containing compound is added to the dispersion liquid in which the mother particles processed by the pulverization treatment are dispersed in the nonaqueous medium, and by ultrasonic irradiation, a coating film is formed from the fluorine-containing compound on the surfaces of the mother particles. As described above, an aluminum pigment in which the surfaces of the mother particles are treated by the fluorine-containing compound is formed. The addition amount of the fluorine-containing compound with respect to 100 parts by mass of the mother particles is 1 to 70 parts by mass, preferably 5 to 40 parts by mass, and more preferably 15 to 30 parts by mass. In addition, when the surface treatment is performed by ultrasonic irradiation, heating may also be performed. As the heating temperature, a temperature of 40° C. or more is preferable. By the heating treatment, it is believed that since the surfaces of the mother particles and the fluorine-containing compound form covalent bonds, the bonding force therebetween is increased.

Although the surface treatment of the mother particles by the fluorine-containing compound may be a direct treatment performed on the surfaces of the mother particles, the treatment by the fluorine-containing compound may also be performed on mother particles which are processed in advance by an acid or a base. Accordingly, chemical modification by the fluorine-containing compound can be reliably performed on the surfaces of the mother particles, and hence, the effect of the invention as described above can be more effectively obtained. In addition, before the surface treatment is performed by the fluorine-containing compound, even if oxide films are formed on the surfaces of particles to be formed into the mother particles, the above oxide films can be removed by an acid or a base, and the surface treatment by the fluorine-containing compound can be performed in the state in which the oxide films are removed, so that the metallic glossiness of an aluminum pigment to be manufactured can be made excellent. As the acid described above, for example, there may be mentioned a protonic acid, such as hydrochloric acid, sulfuric acid, phosphoric acid, nitric acid, boric acid, acetic acid, carbonic acid, formic acid, benzoic acid, chlorous acid, hypochlorous acid, sulfurous acid, hyposulfurous acid, nitrous acid, hyponitrous acid, phosphorous acid, or hypophosphorous acid. On the other hand, as the base, for example, sodium hydroxide, potassium hydroxide, or calcium hydroxide may be mentioned.

Subsequently, solvent replacement is performed. In particular, after the dispersion liquid in which the aluminum pigment is dispersed in the nonaqueous medium is processed by centrifugal separation, and a supernatant solution obtained thereby is discarded, an appropriate amount of an aqueous medium is added to the residue and is then irradiated with ultrasonic waves, so the aluminum pigment is dispersed in the aqueous medium. As described above, an aqueous coating composition in which the aluminum pigment is dispersed is obtained. In addition, the aqueous coating composition thus obtained is preferably further processed by a heating treatment. Since the fluorine-containing compound which is ion-bonded to the surfaces of the mother particles is assumed to form covalent bonds therewith through dehydration by the heating treatment, the mother particles and the fluorine-containing compound can be more strongly bonded to each other, and hence, the effect of the invention as described above can be more effectively obtained. The heating temperature is preferably 50° C. or more and more preferably 60° C. or more. The heating time is preferably 1 to 10 days.

The above aqueous medium may be a medium containing water as a primary component, and for example, an organic solvent, a surfactant, a tertiary amine, and/or a pH adjuster may be further added. The content of water in the aqueous medium is preferably 20 percent by mass or more, more preferably 30 percent by mass or more, and particularly preferably 45 percent by mass or more.

As the organic solvent to be added to the aqueous medium, in view of the compatibility with water, a polar organic solvent is preferable. As the polar organic solvent described above, for example, there may be mentioned an alcohol (such as methyl alcohol, ethyl alcohol, propyl alcohol, butyl alcohol, isopropyl alcohol, or a fluorinated alcohol); a ketone (such as acetone, methyl ethyl ketone, or cyclohexanone); a carboxylic acid ester (methyl acetate, ethyl acetate, propyl acetate, butyl acetate, methyl propionate, or ethyl propionate); an ether (diethyl ether, dipropyl ether, tetrahydrofuran, or dioxane); a polyalcohol (such as ethylene glycol, diethylene glycol, triethylene glycol, a polyethylene glycol, a polypropylene glycol, propylene glycol, butylene glycol, 1,2,6-hexanetriol, thioglycol, hexylene glycol, glycerin, trimethylolethane, or trimethylolpropane); or a glycol ether-based solvent (an alkylene glycol monoether, such as triethylene glycol monobutyl ether, or an alkylene glycol diether, such as diethylene glycol diethyl ether). The content of the organic solvent in the aqueous medium is preferably 60 percent by mass or less and more preferably 45 to 55 percent by mass. When the content of the organic solvent is in the range described above, the water resistance of the aluminum pigment is improved, and in addition, the metallic glossiness thereof is improved in some cases.

As the surfactant to be added to the aqueous medium, a fluorine-based surfactant and/or a silicone-based surfactant is preferably used. The content of the surfactant in the aqueous medium is preferably 3 percent by mass or less, more preferably 0.01 to 2 percent by mass, and particularly preferably 0.1 to 1 percent by mass. When the content of the surfactant is in the range described above, the water resistance of the aluminum pigment tends to be further improved. In addition, when a metallic glossy image is recorded, a function as a slipping agent is obtained, and hence, an effect of improving abrasion resistance of the image may be obtained in some cases.

As the fluorine-based surfactant, for example, there may be mentioned Megafac F-430, Megafac F-444, Megafac F-472SF, Megafac F-475, Megafac F-477, Megafac F-552, Megafac F-553, Megafac F-554, Megafac F-555, Megafac F-556, Megafac F-558, Megafac R-94, Megafac RS-75, or Megafac RS-72-K (each trade name, manufactured by DIC Corporation); EFTOP EF-351, EFTOP EF-352, EFTOP EF-601, EFTOP EF-801, or EFTOP EF-802 (each trade name, manufactured by Mitsubishi Materials Corporation); FTERGENT 222F, FTERGENT 251, or FTX-218 (each trade name, manufactured by Neos Co., Ltd.); or Surflon SC-101 and Surflon KH-40 (each trade name, manufactured by AGC Seimi Chemical Co., Ltd.).

As the silicone-based surfactant, for example, there may be mentioned BYK-300, BYK-306, BYK-310, BYK-320, BYK-330, BYK-344, BYK-346, BYK-UV3500, or BYK- UV3570 (each trade name, manufactured by BYK Japan K.K.); or KP-341, KP-358, KP-368, KF-96-50CS, or KF-50-100CS (each trade name, manufactured by Shin-Etsu Chemical Co., Ltd.).

As the tertiary amine to be added to the aqueous medium, for example, there may be mentioned a hydroxylamine, such as triethanolamine, tripropanolamine, tributanolamine, N,N-dimethyl-2-aminoethanol, or N,N-diethyl-2-aminoethanol. Since the tertiary amine is added to the aqueous medium, by a steric hindrance effect and a pH adjustment function, the water dispersibility of the aluminum pigment may be improved in some cases.

As the pH adjuster to be added to the aqueous medium, a pH adjuster having a buffering action capable of adjusting the pH to a range of 4 to 10 is preferable. In a pH range of 4 to 10, the zeta potential of the aluminum pigment (in particular, aluminum and/or an aluminum alloy) becomes negative, and the water dispersibility of the aluminum pigment is improved by the electrostatic repulsion between the aluminum pigment particles. As the pH adjuster having the buffering action as described above, for example, there may be mentioned Good's buffers, such as 4-(2-hydroxyethyl)-1-piperazineethane sulfonic acid (HEPES), morpholinoethane sulfonic acid (MES), carbamoylmethyliminobis acetic acid (ADA), piperazine-1,4-bis(2-ethanesulfonic acid) (PIPES), N-(2-acetamido)-2-aminoethane sulfonic acid (ACES), colamine hydrochloride, N,N-bis(2-hydroxyethyl)-2-aminoethane sulfonic acid (BES), N-tris(hydroxymethyl)methyl-2-aminoethane sulfonic acid (TES), acetamide glycine, tricine, glycine amide, and bicine; a phosphate buffer; and a tris buffer.

2. Pigment Paste

The pigment paste according to this embodiment contains components similar to those of the above aqueous coating composition, and the content of the solvent including water and/or a organic solvent is smaller than that of the aqueous coating composition. In the pigment paste according to this embodiment, the aluminum pigment particles are suppressed from being agglomerated, and the storage stability thereof is improved. In addition, by the effect of fluorine atoms in the fluorine-containing compound bonded to the surfaces of the aluminum pigment particles, surface free energy can be reduced; hence, leafing of the aluminum pigment can be easily obtained during drying, and an image excellent in metallic glossiness can be formed.

The "paste" in this specification indicates a viscous liquid containing as a liquid medium, 50 percent by mass or less of water or preferably 30 percent by mass or less thereof. As the water, pure water, such as ion-exchanged water, ultrafiltrated water, reverse osmosis water, or distilled water; or ultrapure water is preferably used. In particular, water sterilized, for example, by UV-ray radiation or addition of hydrogen peroxide is preferable since the generation of bacteria and fungi can be suppressed for a long time.

The concentration of the aluminum pigment in the pigment paste according to this embodiment with respect to the total mass is, as a solid component, preferably 10 to 50 percent by mass, more preferably 10 to 45 percent by mass, and further preferably 15 to 40 percent by mass.

3. Examples

Hereinafter, although the invention will be described in detail with reference to Examples, the invention is not limited thereto. In Examples and Comparative Examples, "part(s)" and "%" are described on the mass basis unless otherwise particularly noted.

3.1. Manufacturing of Aqueous Coating Composition

3.1.1. Example 1

First, a film (surface roughness Ra: 0.02 μm or less) which had a smooth surface and which was formed of a poly (ethylene terephthalate) was prepared.

Next, a silicone oil was applied on one entire surface of this film. On the surface side on which this silicone oil was applied, a film (hereinafter, also simply called "aluminum film") was formed from aluminum using a deposition method.

Next, the film on which the aluminum film was formed was placed in diethylene glycol diethyl ether and was then irradiated with ultrasonic waves, so that the aluminum film was peeled away from the film and pulverized. Subsequently, the aluminum film thus processed was charged in a homogenizer and then processed by a pulverization treatment for approximately 8 hours, so that a dispersion liquid of scale-shaped aluminum particles (mother particles) was obtained. The concentration of the aluminum particles in this dispersion liquid was 10 percent by mass.

Next, an aluminum surface treatment as shown in the upper portion of Table 1 was performed. After 100 parts by mass of diethylene glycol diethyl ether was added to 100 parts by mass of the dispersion liquid containing aluminum particles obtained as described above so that the concentration of the aluminum particles was controlled to 5 percent by mass, 50 parts by mass of 2-(perfluorohexyl)ethyl phosphonic acid (FHP-2-OH: manufactured by NOK Corporation) was added to 100 parts by mass of the aluminum particles, and the aluminum particles were then surface-treated at a liquid temperature of 55° C. for 3 hours while ultrasonic waves were irradiated. Subsequently, after centrifugal sedimentation of the above surface-treated aluminum particles was performed by a centrifugal separator (at 10,000 rpm for 30 minutes), and the supernatant portion thereof was discarded, the residue thus obtained and an aqueous medium (mixture of 1 percent by mass of Olfine E1010 (manufactured by Nisshin Chemical Industry Co., Ltd.), 29 percent by mass of water, and 70 percent by mass of diethylene glycol monobutyl ether) in an amount equivalent to that of the residue were mixed together and then further irradiated with ultrasonic waves to re-disperse the surface-treated aluminum particles, so that a paste was obtained.

The average particle diameter (D) (D50) of the aluminum particles in this paste was 9 μm, and the average thickness (Z) was 20 nm.

In addition, after the paste (pigment solid component), Polysol AP-7010N (resin emulsion: manufactured by Showa Denko K.K.), a surfactant, an organic solvent (mixed solvent containing BDP and BD at a BDP/BD ratio of 8/7) were mixed together, ion-exchanged water was added to the above mixture so that the total amount was 100 percent by mass and then mixed again by stirring, and as a result, an aqueous coating composition of each Example was obtained as shown in the central portion of Table 1. In addition, BDP and BE are abbreviations indicating dipropylene glycol monobutyl ether and diethylene glycol monobutyl ether, respectively.

3.1.2. Examples 2 to 4 and Comparative Example 1

Except for that the addition amount of 2-(perfluorohexyl) ethyl phosphonic acid was set as shown in Table 1, and FHP was not used in Comparative Example 1, an aqueous coating composition of surface-treated aluminum particles was manufactured in a manner similar to that of Example 1.

3.1.3. Examples 5 and 6

Except for that the fluorine-containing compound used for the surface treatment was changed to FBP-2-OH (2-(perfluorobutyl)ethyl phosphonic acid, manufactured by NOK Corporation), and the addition amount was set as shown in Table 1, an aqueous coating composition of surface-treated aluminum particles was manufactured in a manner similar to that of Example 1.

3.1.4. Examples 7 to 14 and Comparative Examples 2 to 5

Except for that the thickness of the aluminum particles was changed by changing the deposition time, the particle diameter was changed by changing the pulverization time, and the amount of aluminum, the type or the amount of the surface treatment agent, or the type or the amount of the surfactant was changed as shown in Table 1, an aqueous coating composition of surface-treated aluminum particles was manufactured in a manner similar to that of Example 1. In addition, in the table, LAP represents lauric phosphoric acid is not a fluorine-containing compound.

3.1.5. Comparative Example 6

Except for that as the aluminum particles, spherical particles were used instead of tabular particles, an aqueous coating composition of surface-treated aluminum particles was manufactured in a manner similar to that of Example 1.

TABLE 1

| (PERCENT BY MASS) | | | EXAMPLE | | | | | | | | | |
|---|---|---|---|---|---|---|---|---|---|---|---|---|
| | | | 1 | 2 | 3 | 4 | 5 | 6 | 7 | 8 | 9 | 10 |
| ALUMINUM SURFACE TREATMENT | | | | | | | | | | | | |
| ALUMINUM | | | 5 | 5 | 5 | 5 | 5 | 5 | 5 | 5 | 5 | 5 |
| AMOUNT OF SURFACE TREATMENT AGENT | FHP | | 1 | 0.5 | 1.5 | 2.5 | — | — | 1 | 1 | 1 | 1 |
| | FBP | | — | — | — | — | 1 | 1.5 | — | — | — | — |
| | LAP | | — | — | — | — | — | — | — | — | — | — |
| AVERAGE THICKNESS (nm)(Z) | | | 20 | 20 | 20 | 20 | 20 | 20 | 80 | 8 | 10 | 10 |
| AVERAGE PARTICLE DIAMETER (μm)(D) | | | 9 | 9 | 9 | 9 | 9 | 9 | 15 | 5 | 20 | 1.5 |
| D/Z | | | 450 | 450 | 450 | 450 | 450 | 450 | 188 | 625 | 2000 | 150 |
| AQUEOUS COATING COMPOSITION | | | | | | | | | | | | |
| PIGMENT SOLID COMPONENT | | | 5 | 5 | 5 | 5 | 10 | 10 | 20 | 5 | 3 | 3 |
| | AP-7010N | | 25 | 25 | 25 | 25 | 30 | 30 | 25 | 25 | 25 | 25 |
| SURFACTANT | D102 | | 1 | 1 | 2 | 2 | 1 | 1 | — | — | — | — |
| | DA325 | | — | — | — | — | — | — | 5 | 1 | 1 | 1 |
| ORGANIC SOLVENT | BDP | | 8 | 8 | 8 | 8 | 8 | 8 | 8 | 8 | 8 | 8 |
| | BD | | 7 | 7 | 7 | 7 | 7 | 7 | 7 | 7 | 7 | 7 |
| WATER | | | 54 | 54 | 53 | 53 | 44 | 44 | 35 | 54 | 56 | 56 |
| pH | | | 7.5 | 7.5 | 6.5 | 6.5 | 7.2 | 7.3 | 7.3 | 8.2 | 8.4 | 8.4 |
| EVALUATION RESULT | HYDROGEN GENERATION | | A | B | A | A | B | B | A | C | A | A |
| | SEDIMENTATION | | A | B | A | A | A | A | C | A | C | A |
| | GLOSSINESS | | A | A | A | A | A | A | C | B | A | B |
| | ADHESION | | A | A | A | A | A | A | C | C | B | B |

| (PERCENT BY MASS) | | | EXAMPLE | | | | COMPARATIVE EXAMPLE | | | | | |
|---|---|---|---|---|---|---|---|---|---|---|---|---|
| | | | 11 | 12 | 13 | 14 | 1 | 2 | 3 | 4 | 5 | 6 |
| ALUMINUM SURFACE TREATMENT | | | | | | | | | | | | |
| ALUMINUM | | | 10 | 1.5 | 20 | 3 | 5 | 5 | 5 | 5 | 5 | 5 |
| AMOUNT OF SURFACE TREATMENT AGENT | FHP | | 3 | 0.4 | 6 | 1.2 | — | 1 | 1 | 0.2 | — | 1 |
| | FBP | | — | — | — | — | — | — | — | — | — | — |
| | LAP | | — | — | — | — | — | — | — | — | 1 | — |
| AVERAGE THICKNESS (nm)(Z) | | | 10 | 10 | 10 | 15 | 20 | 5 | 120 | 5 | 10 | — |
| AVERAGE PARTICLE DIAMETER (μm)(D) | | | 5 | 5 | 5 | 3 | 9 | 5 | 5 | 5 | 5 | 5 |
| D/Z | | | 500 | 500 | 500 | 200 | 450 | 1000 | 42 | 1000 | 500 | — |
| AQUEOUS COATING COMPOSITION | | | | | | | | | | | | |
| PIGMENT SOLID COMPONENT | | | 10 | 5 | 10 | 10 | 5 | 5 | 5 | 5 | 5 | 5 |
| | AP-7010N | | 30 | 25 | 25 | 25 | 25 | 25 | 25 | 25 | 25 | 25 |
| SURFACTANT | D102 | | 1 | 1 | — | — | 1 | 1 | 1 | 1 | — | — |
| | DA325 | | — | — | — | — | — | — | — | — | — | — |
| ORGANIC SOLVENT | BDP | | 8 | 8 | 8 | 8 | 8 | 8 | 8 | 8 | 8 | 8 |
| | BD | | 7 | 7 | 7 | 7 | 7 | 7 | 7 | 7 | 7 | 7 |
| WATER | | | 44 | 54 | 50 | 50 | 54 | 54 | 54 | 54 | 55 | 55 |
| pH | | | 7.5 | 7.5 | 7.5 | 7.5 | 7.5 | 7.5 | 4.9 | 9.2 | 7.5 | 7.5 |

TABLE 1-continued

| EVALUATION RESULT | HYDROGEN GENERATION | A | A | A | C | E | B | A | C | D | A |
|---|---|---|---|---|---|---|---|---|---|---|---|
| | SEDIMENTATION | A | A | A | A | D | B | D | B | C | D |
| | GLOSSINESS | A | A | B | A | E | D | D | D | E | E |
| | ADHESION | A | A | B | C | A | A | A | A | A | C |

3.2. Evaluation Test

3.2.1. Evaluation of Hydrogen Generation Amount

After the aqueous coating composition of each Example was received in an air-tight container and then left at 35° C. for 10 days, the concentration of a hydrogen gas in the container was measured, so that the hydrogen generation amount (ml/g) was obtained. In addition, the hydrogen generation amount was evaluated in accordance with the following criteria, and the results thereof are shown in Table 1. In addition, the acceptable range is from A to C. In addition, this evaluation can be considered as the evaluation of water resistance of the pigment.

A: 5 (ml/g) or less
B: more than 5 (ml/g) to 10 (ml/g)
C: more than 10 (ml/g) to 20 (ml/g)
D: more than 20 (ml/g) to 50 (ml/g)
E: more than 50 (ml/g)

3.2.2. Evaluation of Sedimentation

The aqueous coating composition of each Example was stirred at 300 rpm for 30 minutes by a magnetic stirrer and was then left at room temperature for one day. Subsequently, the degree of sedimentation was evaluated by visual inspection in accordance with the following criteria, and the results are shown in Table 1. In addition, the acceptable range is from A to C.

A: no sedimentation
B: slight sedimentation
C: apparent sedimentation
D: clear separation

3.2.3. Evaluation of Glossiness of Coating Film

The aqueous coating composition of each Example was applied on printing paper ("PM photographic paper (gloss) model No.: KA450PSK", manufactured by Seiko Epson Corporation) and was then dried at room temperature for one day. Subsequently, by the use of a gloss meter (Minolta Multi Gloss 268), the gloss degree of the coating film was measured at a tilt angle of 60°. The evaluation criteria were set as described below, and the evaluation results of the glossiness are also shown in Table 1. In addition, the acceptable range is from A to C.

A: 350 or more
B: 300 to 350
C: 250 to 300
D: 200 to 250
E: 200 or less

3.2.4. Evaluation of Adhesion of Coating Film

The aqueous coating composition of each Example was applied on coated cardboard by a 3-ml applicator and was then dried at room temperature for 24 hours. After a cellophane tape having a width of 1 cm and a length of 1 cm was adhered onto this coating film and was then vigorously peeled off therefrom by hand, the adhesion of the coating film was evaluated in accordance with the state thereof. This test was repeatedly performed 10 times, and the evaluation criteria of the adhesion were set as described below. The results are also shown in Table 1. In addition, the acceptable range is from A to C.

A: No peeling of the coating film was observed by 10 evaluation tests.
B: Peeling or floating was observed once among 10 evaluation tests.
C: Peeling or floating of approximately half of the coating film was observed twice among 10 evaluation tests.
D: Peeling or floating was observed at least three times among 10 evaluation tests.

3.3. Evaluation Results

From the evaluation results shown in Table 1, according to the aqueous coating composition of each Example containing an aluminum pigment composed of tabular particles which were surface-treated by the fluorine-containing compound and which had an average thickness (Z) of 8 to 100 nm in a thickness direction thereof, the hydrogen generation amount was small, the water resistance of the pigment during storage was preferable, and the glossiness of the coating film formed therefrom was preferable.

On the other hand, according to the aqueous coating composition of Comparative Example 1 in which the aluminum pigment which was not surface-treated was used, the generation of hydrogen was remarkably high, and the glossiness of the coating film was seriously inferior. In addition, in Comparative Examples 2 and 4 in which the thickness of the aluminum pigment was small, such as 5 nm, the glossiness of the coating film was inferior. On the other hand, in Comparative Example 3 in which the thickness of the aluminum pigment was large, such as 120 nm, the glossiness of the coating film was inferior.

Furthermore, according to the aqueous coating composition of Comparative Example 5 in which the surface treatment was not performed by the fluorine-containing compound, the generation of hydrogen was remarkably high, and the glossiness of the coating film was seriously inferior. In addition, in Comparative Example 6 in which spherical aluminum pigment particles were used instead of using the tabular particles, the glossiness of the coating film was inferior.

On the other hand, from the results of Examples 7 and 9 and Comparative Example 3, it was found that the correlation was present between the degree of sedimentation and the ratio (D/Z), the average thickness, and the average particle diameter, and in particular, it was found that as for the ratio (D/Z) and the average particle diameter, there were preferable ranges.

The invention is not limited to the above embodiments and may be variously modified. For example, the invention includes substantially the same structure (such as the same structure relating to the function, the method, and the result or the same structure relating to the object and the effect) as that described in the embodiments. In addition, the invention includes the structure in which a nonessential portion of the structure described in the embodiments is replaced. In addition, the invention includes the structure that achieves the same function/effect or the same object as that of the structure described in the embodiments. Furthermore, the invention includes the structure in which a known technique is imparted to the structure described in the embodiments.

The entire disclosure of Japanese Patent Application No. 2017-121237, filed Jun. 21, 2017 is expressly incorporated by reference herein.

What is claimed is:

1. An aqueous coating composition comprising:
an aluminum pigment; and
a polyoxyethylene alkyl ether phosphoric acid compound,
wherein the aluminum pigment is composed of tabular particles which are surface-treated by a fluorine-containing compound,
the aluminum pigment also has an average thickness (Z) of 8 to 100 nm, and
a content of the polyoxyethylene alkyl ether phosphoric acid compound is 1 to 5 percent by mass with respect to a total of the aqueous coating composition.

2. The aqueous coating composition according to claim 1, wherein an average particle diameter (D) of the aluminum pigment is 3 to 20 μm.

3. The aqueous coating composition according to claim 1, wherein a ratio (D/Z) of an average particle diameter (D) to the average thickness (Z) of the aluminum pigment is 10 to 1,500.

4. The aqueous coating composition according to claim 1, wherein a content of the aluminum pigment is 3 to 20 percent by mass with respect to a total of the aqueous coating composition.

5. The aqueous coating composition according to claim 1, wherein the aqueous coating composition further comprises a resin emulsion.

6. The aqueous coating composition according to claim 1, wherein the aqueous coating composition has a pH of 6.5 to 8.4.

7. The aqueous coating composition according to claim 1, wherein the polyoxyethylene alkyl ether phosphoric acid compound is a compound represented by the following formula or its salt $$RO[(CH_2CH_2O)_n]_mPO(OH)_{3-m},$$

and
in the formula, R, n, and m representing an alkyl group, an integer of 1 or more, and an integer of 1 to 3, respectively.

* * * * *